(12) United States Patent
Sattler

(10) Patent No.: US 7,131,923 B2
(45) Date of Patent: Nov. 7, 2006

(54) LOW-VIBRATION HYBRID V-BELT

(75) Inventor: Heiko Sattler, Hannover (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 127 days.

(21) Appl. No.: 10/479,182

(22) PCT Filed: May 23, 2002

(86) PCT No.: PCT/EP02/05647

§ 371 (c)(1),
(2), (4) Date: Dec. 1, 2003

(87) PCT Pub. No.: WO02/099310

PCT Pub. Date: Dec. 12, 2002

(65) Prior Publication Data

US 2005/0176541 A1    Aug. 11, 2005

(30) Foreign Application Priority Data

Jun. 2, 2001    (DE)    ................... 101 27 092

(51) Int. Cl.
*F16G 5/16*    (2006.01)
(52) U.S. Cl. ..................... 474/242; 474/201
(58) Field of Classification Search ............. 474/201, 474/202, 237, 238, 240, 242, 245
See application file for complete search history.

(56) References Cited

U.S. PATENT DOCUMENTS

| | | | |
|---|---|---|---|
| 4,303,403 A * | 12/1981 | Lamers | 474/201 |
| 4,457,742 A | 7/1984 | Hattori et al. | |
| 4,484,903 A * | 11/1984 | Schneider | 474/242 |
| 4,612,005 A * | 9/1986 | Miranti, Jr. | 474/201 |
| 4,906,225 A * | 3/1990 | van Lith | 474/242 |
| 5,242,332 A * | 9/1993 | Douhairet et al. | 474/146 |
| 6,500,086 B1 * | 12/2002 | Serkh et al. | 474/245 |
| 6,634,975 B1 * | 10/2003 | Yuan | 474/242 |

FOREIGN PATENT DOCUMENTS

| | | |
|---|---|---|
| EP | 0 826 901 | 3/1998 |
| JP | 05 209652 | 12/1993 |

* cited by examiner

*Primary Examiner*—Vicky A. Johnson
(74) *Attorney, Agent, or Firm*—Walter Ottesen

(57) ABSTRACT

In a low-vibration V-belt (2), consisting of at least one load carrier (4; 4a, 4b) and a plurality of support elements (6) located thereon, the damping effect is improved. The formation of the damping elements (34) in a radial direction above the central section and in the direction of the width of the belt substantially symmetrical to the axis of symmetry of the support element (6) allows both possible transversal vibrations to be simultaneously damped. The damping elements (34), which consist preferably of elastomer and have high inherent damping properties, can be seated in recesses or bores (36) of the support elements (6). The rear faces of the support elements (6) can have cylindrical counterforms (38), which correspond in shape and position to the convex damping elements (34) located on the respective front faces. The edges of the convex parts (34) have radii or chamfers which permit the corresponding counterparts (34, 38) to engage without force or impact. The V-belt can be used for the continuously variable speed and torque conversion in automotive applications.

8 Claims, 4 Drawing Sheets

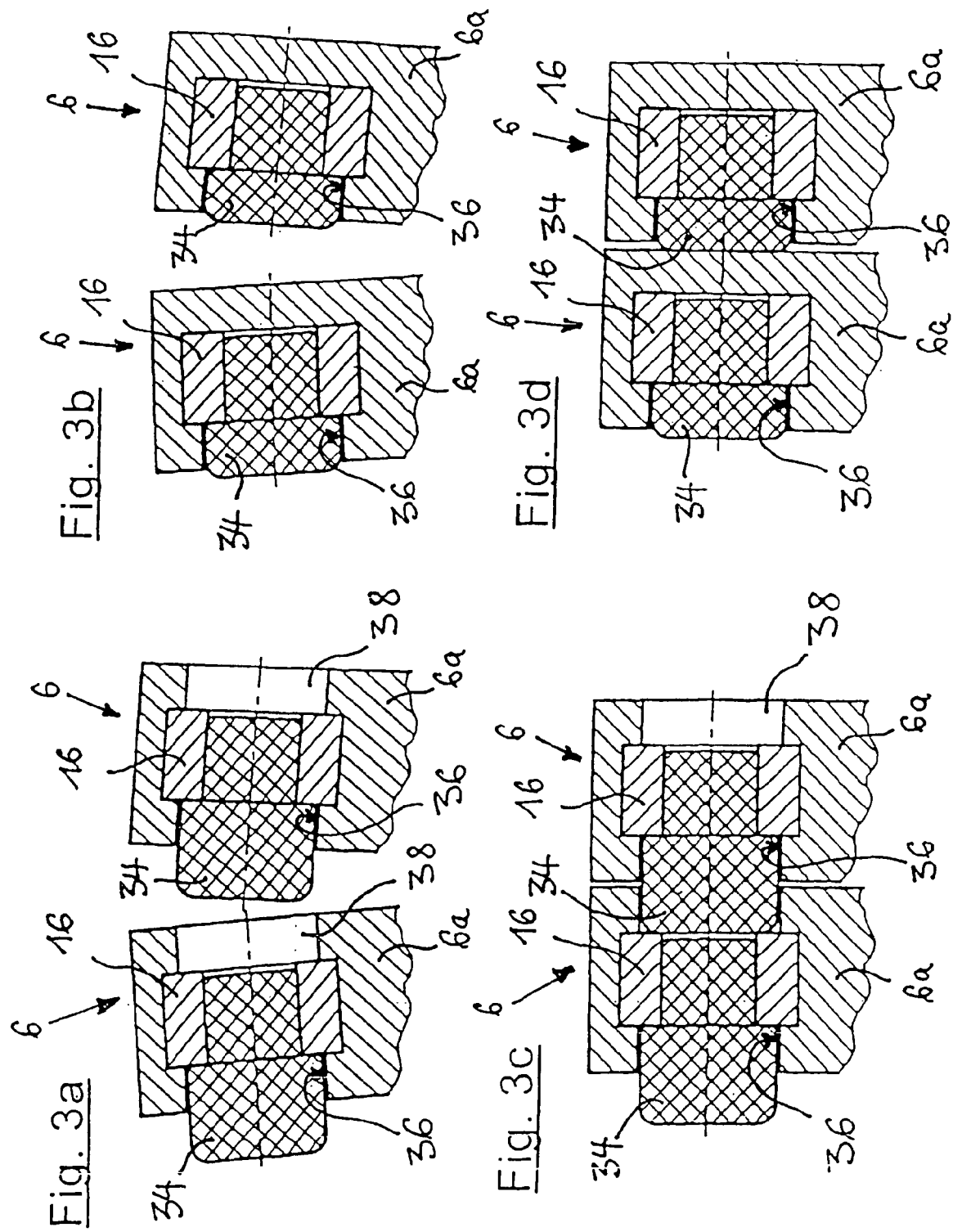

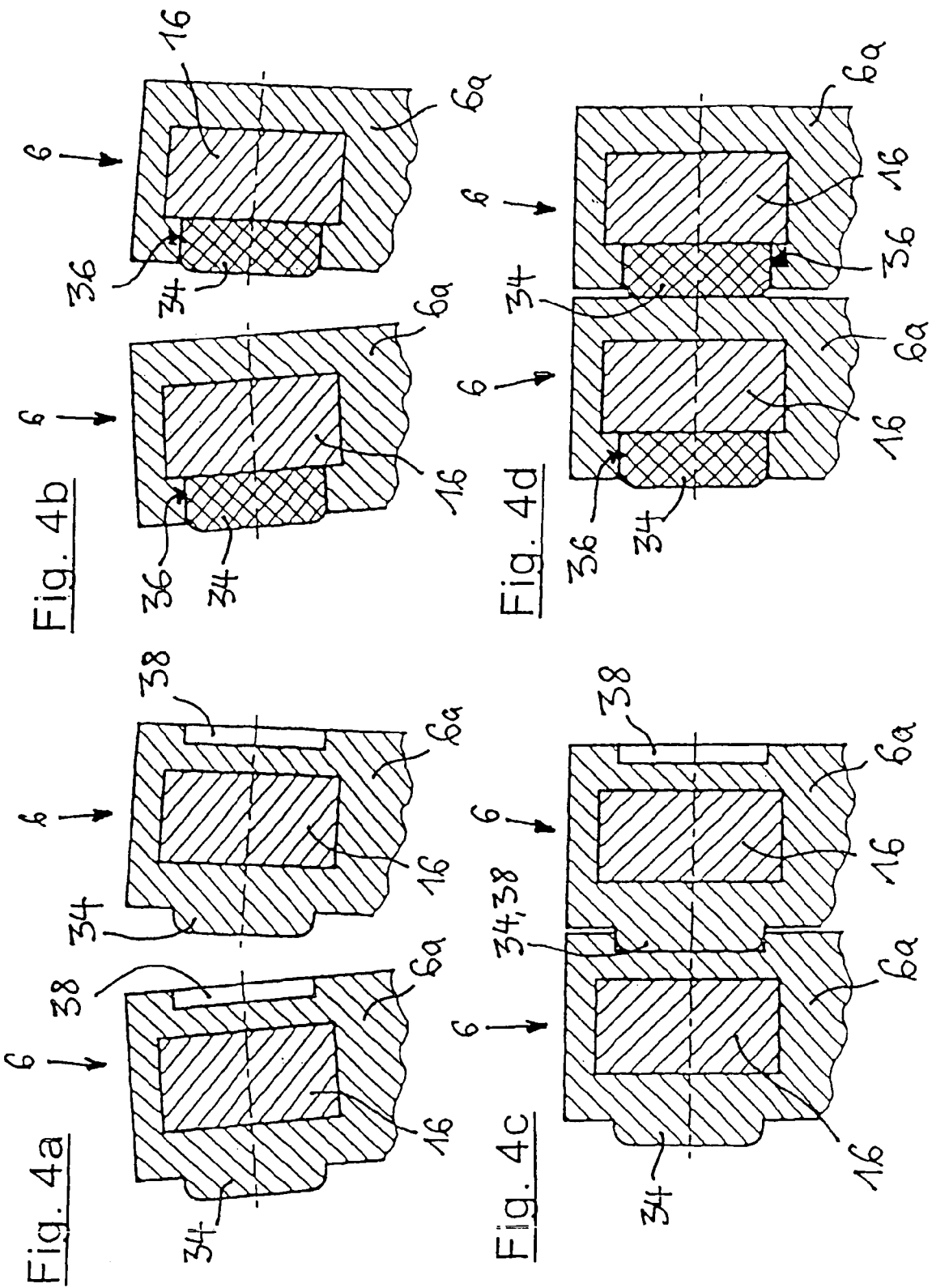

LOW-VIBRATION HYBRID V-BELT

RELATED APPLICATION

This application is the national stage of PCT/EP 02/05647, filed May 23, 2002, designating the United States and claiming priority from German patent application no. 101 27 092.5, filed Jun. 2, 2001, the entire contents of which are incorporated herein by reference.

FIELD OF THE INVENTION

The invention relates to a hybrid V-belt including at least a tension carrier as well as a plurality of support elements arranged thereon.

BACKGROUND OF THE INVENTION

A series of different configurations of hybrid V-belts having stiffened support elements are known. Because of the high torques, which are to be transmitted in drives with such belts, large force differences occur in different belt segments and therefore also very low no-load belt forces occur. Especially in such operating states, the non-loaded segments of a belt tend to transverse vibrations. Transverse vibrations of this kind occur preferably in two planes, on the one hand, with deflections in the direction of the belt elevation and, on the other hand, in the direction of the width of the belt.

In a known configuration (EP 0 826 901 A2), the stiffening support elements viewed in the longitudinal direction of the belt are equipped with guide projections and corresponding recesses on their forward and rearward sides which are configured in a plastic layer surrounding a core. The projections and recesses are arranged centrally on the forward faces and rearward faces of the support elements directed in the belt running direction in that they are placed approximately in the center of the belt width direction and approximately in the center in radial direction at the elevation of the tension cords. These projections and recesses have the form of truncated cones or truncated spheres. In other configurations, such guide elements are not present.

SUMMARY OF THE INVENTION

The invention provides for a large inherent damping for hybrid V-belts. Transversal belt segment vibrations having increasing amplitudes or steady-state large amplitudes are avoided.

The configuration of damping elements (which are arranged in radial direction above the center and preferably symmetrical in belt width direction) simultaneously limits possible transverse vibrations in two mutually perpendicular planes and thereby minimizes the vibration amplitudes. In radial direction, the deflection is limited radially inwardly starting from the stretched state. In belt width direction, the amplitude is limited in both directions relative to the linear state without vibration bellies.

In a known configuration, guide elements of a relatively hard and little deforming resin-based plastic are used which are hardly in a position to dissipate vibration energy because of the material inherent damping which is practically not present. In contrast, in the invention, damping elements are used which preferably comprise, for example, elastomers having a pronounced high material inherent damping.

These damping elements are advantageously seated in recesses or bores which are anyway present on the support elements after the manufacture.

The damping elements and their counterforms are configured to be cylindrical. The edges of the projections are provided with radii or chamfers which permit a force-free and impact-free interengagement of the corresponding forms. The cylindrical form, as a simple centering element, is present in many cases because of manufacture and must therefore in this case not be generated separately.

If pronounced damping action of the material, as present in elastomers, is dispensed with, the projections and recesses can be formed above the center from the base material.

The radii furthermore permit an improvement of the running performance by mutually running-in and adjustment of the forms associated with each other during the first operating hours.

The attachment and centering of the damping elements preferably takes place with a form-tight connection in core material and plastic casing and by form-tight connection only in the casing or via material locking with abrasive or cohesive material joining.

The damping action can be achieved depending upon the material characteristics in that either a damping element is configured as a projecting surface without specially formed countersurface or that a combination of projection and recess is introduced at the end face and rear face of the one support element and the counterface of the other support element.

The damping elements can essentially be arranged symmetrical to the axis of a support element in the belt width direction and can be arranged on the upper, that is, the radially outwardly directed part of the end face or rear face of a support element.

BRIEF DESCRIPTION OF THE DRAWING

In the following, the damping elements of the invention are explained in greater detail with respect to the drawings.

FIGS. 3 and 4 show detail section views in the upper region through two support elements seen from the side with each at maximal curvature (FIGS. 3a, 3b and FIGS. 4a, 4b) and in the stretched state (FIGS. 3c, 3d and FIGS. 4c, 4d);

FIGS. 3a and 3c show an elastomeric damper guided in the core and the surrounding layer having a counterform on the back side;

FIGS. 3b and 3d show an elastomeric damper guided in the core and the surrounding layer without counterform on the back side;

FIGS. 4a and 4c show a damper integrated in the surrounding plastic; and,

FIGS. 4b and 4d show an elastomeric damper only in the surrounding layer guided without counterform on the back side.

DESCRIPTION OF THE PREFERRED EMBODIMENTS OF THE INVENTION

Figure 1A:
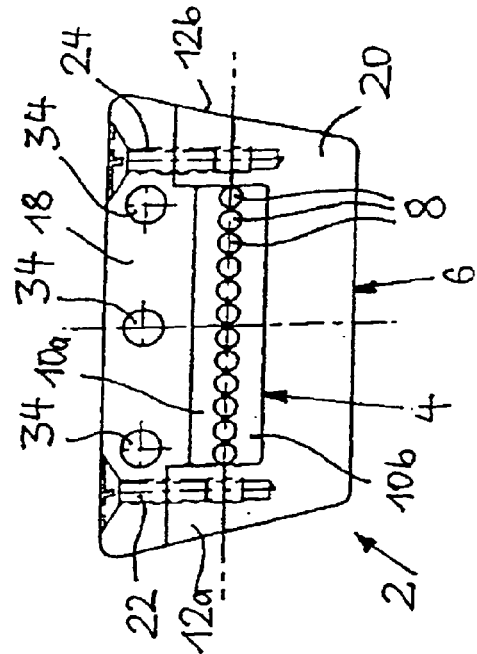
FIG. 1a is a one-part laterally slotted support element having a stiffened core in the upper region.

The embodiments of the hybrid V-belt 2 of the invention shown in FIGS. 1a to 1d each comprise at least one tension carrier (load carrier) 4 or 4a and 4b as well as a plurality of support elements (support blocks) 6. The at least one tension carrier (4; 4a, 4b) is reinforced with tension cords 8 which typically are glass fibers, aramide or steel cords. The tension cords 8 are surrounded on the upper side and/or lower side by elastomeric bodies (10a, 10b) which, in turn, are covered toward the outside optionally by fabric layers. The support elements 6 are made of a material having a higher resistance to deformation than the at least one load carrier (4; 4a, 4b) and these elements are preferably made of aluminum.

Figure 1C:
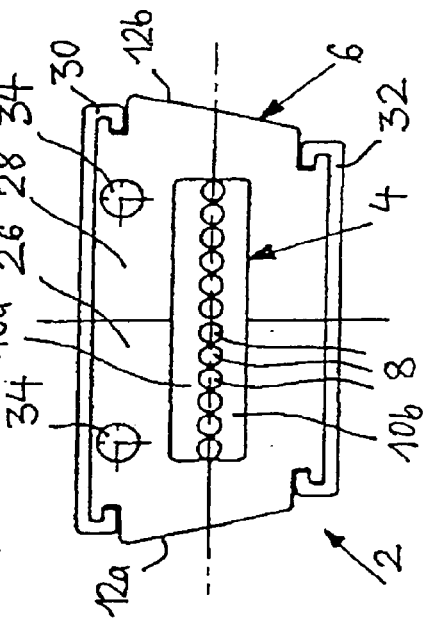
FIG. 1c is a two-part screwed support element having a part joint in the belt width direction; and, FIG. 1d is a two-part support element having clamps and part joint in radial direction.
Figure 1B:
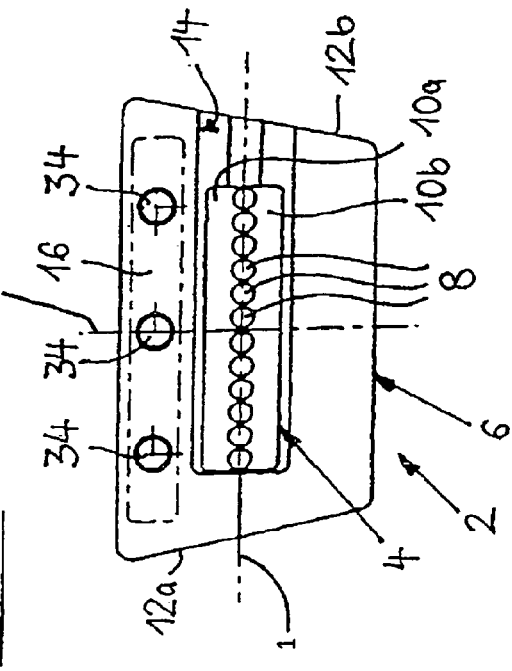
FIG. 1b is a one-part symmetrical support element having a stiffened core in the upper region.
Figure 1D:
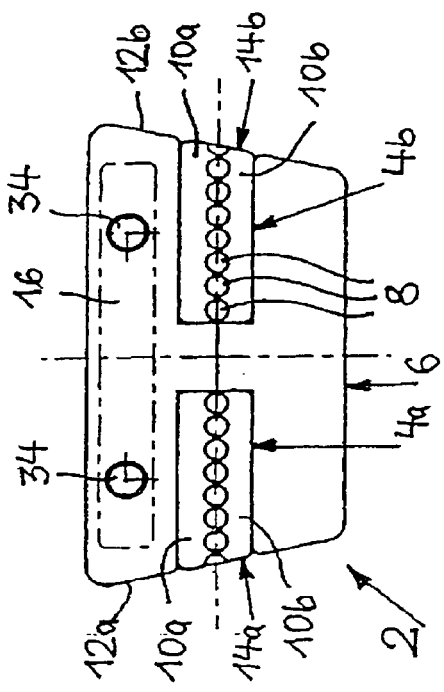
FIG. 1 shows views of known structural forms viewed in belt longitudinal direction having additional damping elements.
Figure 2A:
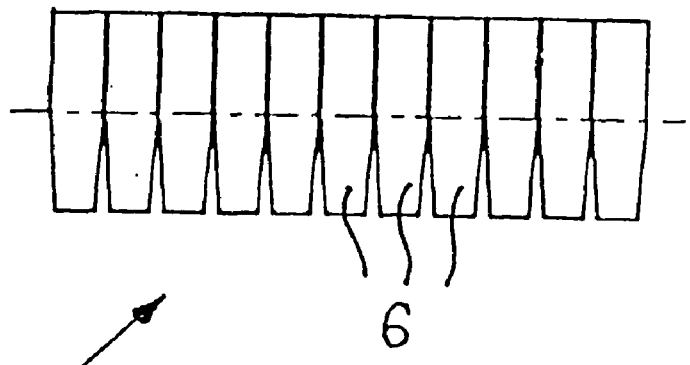
FIG. 2a is a belt cross section having support elements in the stretched state seen in side elevation without damping elements.
Figure 2B:
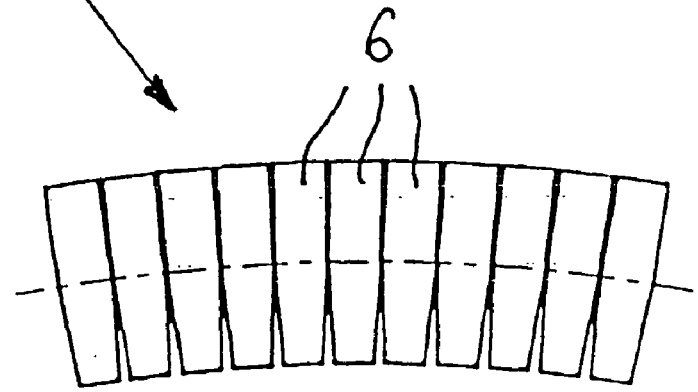
FIG. 2b is a belt segment, in side elevation view, deflected because of vibrations; and, FIG. 2c is a belt segment in plan view deflected because of vibrations.
Figure 2C:
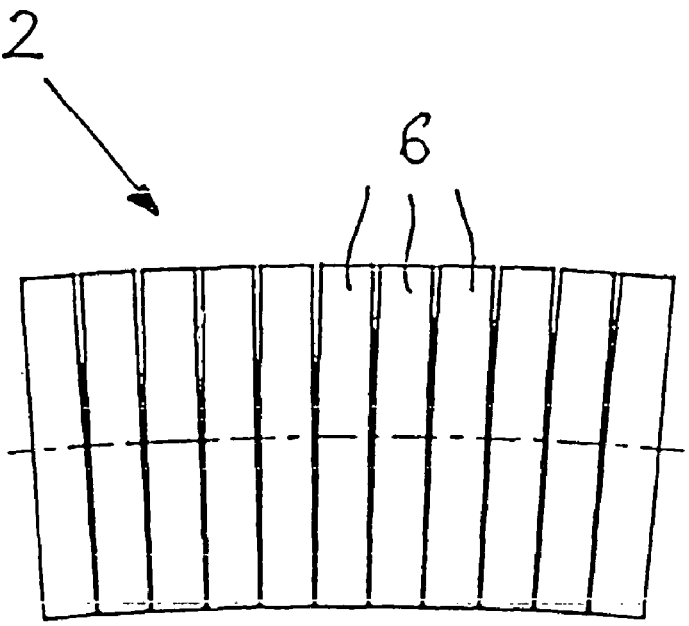

As shown in FIGS. 1a to 1d, the different embodiments of the support elements 6 according to the invention have an approximate trapezoidal cross section. Two mutually adjacent side surfaces (12a, 12b) are inclined toward each other in such a manner that they correspond to the flanks of a belt disc (not shown). The support elements 6 can be in one part (FIGS. 1a and 1b) or in two parts (FIGS. 1c and 1d).

The support elements 6 shown in FIG. 1a laterally includes a slot 14 for accommodating a tension carrier 4. In the tension carrier 4, tension cords 8 are embedded in the longitudinal direction. To influence the center of gravity position and for stiffening, a reinforcement part (reinforcing core) is embedded in the support elements 6 shown in FIGS. 1a and 1b. The reinforcement part 16 has a higher specific weight.

According to FIG. 1b, a slot (14a, 14b) is introduced in each of opposite lying side surfaces (12a, 12b). These two slots (14a, 14b) run from the side surfaces (12a, 12b) in a direction toward the center region of the support element 6.

The support element 6 is provided on each side with a load carrier (tension carrier) (4a, 4b) which are placed in corresponding ones of the side slots (14a, 14b). Here too, continuous tension cords 8 are embedded in the load carriers (4a, 4b).

The support elements 6, which are shown in FIGS. 1c and 1d; are in two parts and the support element 6 according to FIG. 1c has a lower part 20 and an upper part 18 which are held together by screws (22, 24). The support element 6 of FIG. 1d includes left/right symmetrical parts (26, 28) which are connected to each other by clamps (30, 32).

The circles identified by "34" in FIGS. 1a to 1d show the damping elements according to the invention. The damping elements 34 are, for example, made of elastomer and have a high material inherent damping. These damping elements 34 are preferably seated in recesses or bores which are disposed above the center in radial direction. As shown, the damping elements 34 are arranced symmetrically about the axis of symmetry 3 with one of the damping elements 34 being directly on the axis of symmetry 3.

The embodiment of the damping elements 34 is shown, by way of example, in FIGS. 3 and 4. FIGS. 3 and 4 each show, in side elevation view, a section through the upper radially outward directed part of a support element 6 with a reinforcement part 16 according to FIG. 1a.

FIG. 3a shows a section view through two support elements 6 arranged one behind the other while the belt (not shown) is under curvature and FIG. 3c shows the stretched belt segment. In the plastic jacket or casing 6a of the support element 6 and in the reinforcing core 16, cylindrical cutouts 36 are provided for production or other reasons into which the damping elements 34, preferably having corresponding forms, are seated, here, with the form of a recessed cylinder.

In the embodiment of FIGS. 3a and 3c, the damping elements 34 are seated in cutouts 38 of the reinforcing core 16 and the surrounding plastic casing 6a. On the rearward side of the support elements 6, there are likewise cutouts 38 into which the damping elements 34 of the support element 6, which is arranged therebehind, can engage without impact. A jamming in the engaging movement is avoided by roundings or chamfers on the hollow forms 38 and/or on the damping elements 34 as shown in the FIGS.

In FIGS. 3b and 3d, section views of two support elements 6 arranged one behind the other are shown in the state of curvature and in the state of the stretched belt segment. The damping elements 34 are seated in the reinforcing core 16 and the surrounding plastic casing 6a. However, on the rearward side of the same support element 6, no counterform 38 is provided; rather, the damping action is achieved with comparatively short damping elements 34 against an essentially planar rearward side on the forward support element 6.

FIGS. 4a and 4c show an embodiment of damping elements 34 with forms corresponding to each other (damping element 34, counterform 38) at the front side and back side of a support element 6 wherein the material inherent damping of the casing 6a is utilized. In the illustration of the stretched belt segment in FIG. 4c, the support of the engaging movement by the roundings on the damping elements 34 is apparent.

In the embodiment of FIGS. 4b and 4d, the damping elements 34 are seated in an end face cutout 36 of the surrounding casing 6a without a corresponding counterform 38 being present on the rearward side of the next element 6. The damping action is achieved in the same manner as in the embodiment in FIGS. 3b and 3c against an essentially planar surface.

The attachment of the damping elements 34 in their guiding cutouts 36 is achieved by fits (FIG. 3a, reinforcement part having a surrounding casing), form-tight (FIG. 4b, contact on the core) and material locking or a combination of these measures.

LIST OF REFERENCE NUMERALS

2 Hybrid v-belt
4; 4a, 4b Load carrier, tension carrier
6 Support block, support element
6a Plastic casing of support element 6
8 Tension cords
10a, 10b Elastomeric bodies
12a, 12b Side surfaces of the support block 6
14; 14a, 14b Slot
16 Reinforcement part of support element 6, reinforcing core
18 Upper part of support block 6
20 Lower part of support block 6
22, 24 Screws
26, 28 Left/right symmetrical parts of the support block 6
30, 32 Clamps
34 Damping element, convex part
36 Cutout, bore, recess
38 Cutout, hollow form, counterform

The invention claimed is:
1. A low-vibration hybrid V-belt comprising:
at least one tension carrier;
a plurality of support blocks mounted thereon;

each of said support blocks defining a center line and having an axis of symmetry;

a plurality of damping elements arranged on said support blocks in radial direction above said center line;

said damping elements being arranged symmetrically to said symmetry axis in the direction of the belt width;

said damping elements being made of a material having an adequate inherent damping to minimize or reduce vibrations during operation of said hybrid V-belt;

said damping elements being made of elastomer; and, one of said damping elements being mounted on the symmetrical axis on the upper part of the support block.

2. The hybrid V-belt of claim 1, wherein said damping elements are individual elements seated in recesses or bores of said support blocks.

3. The hybrid V-belt of claim 2, wherein the securing and centering of the damping elements takes place by means of at least one of the following: form-tight connection in core material and plastic casing; form-tight connection only in the plastic casing; and, material locking.

4. The hybrid V-belt of claim 1, wherein said damping elements are convexly configured damping elements; said support blocks have counter arms on their rearward sides which, in position and form, correspond to said convexly configured damping elements mounted on each forward side; and, the edges of the convex portions are provided with at least one of radii and chamfers which permit a force-free and impact-free interengagement of the corresponding forms.

5. The hybrid V-belt of claim 4, wherein said support blocks each have a plastic casing; and, said damping elements and said counterforms are formed in said plastic casing of the support block.

6. The hybrid V-belt of claim 1, wherein the damping takes place via at least one of the following: the arrangement of damping elements on the forward or rearward side of the support blocks; and, mutually fitting forms on the rearward side of the one support block and the forward side of the other support block.

7. The hybrid V-belt of claim 1, wherein said damping elements are mounted centrally on one of the forward and rearward sides of said support blocks.

8. The hybrid V-belt of claim 1, wherein each of said support blocks is made of a material having a high resistance to deformation.

* * * * *

UNITED STATES PATENT AND TRADEMARK OFFICE
CERTIFICATE OF CORRECTION

PATENT NO. : 7,131,923 B2 Page 1 of 1
APPLICATION NO. : 10/479182
DATED : November 7, 2006
INVENTOR(S) : Heiko Sattler It is certified that error appears in the above-identified patent and that said Letters Patent is hereby corrected as shown below:

In column 3:
Line 45: delete "1d;" and substitute -- 1d, -- therefor.
Line 55: insert -- line 1 -- after "center".

In column 4:
Line 46: delete "v-belt" and substitute -- V-belt -- therefor.

Signed and Sealed this

Ninth Day of January, 2007

JON W. DUDAS
*Director of the United States Patent and Trademark Office*